United States Patent [19]

Levy

[11] 4,202,396
[45] May 13, 1980

[54] MOTOR VEHICLES AND SUNSHIELDS

[76] Inventor: Abraham Levy, P.O. Box 17212, Tel Aviv, Israel, 69690

[21] Appl. No.: 912,653

[22] Filed: Jun. 5, 1978

Related U.S. Application Data

[63] Continuation-in-part of Ser. No. 409,920, Oct. 26, 1973.

[30] Foreign Application Priority Data

| Jun. 20, 1973 | [IL] | Israel | 5668 |
| Jun. 20, 1973 | [IL] | Israel | 5669 |
| Jun. 28, 1978 | [IL] | Israel | 5672 |
| Jun. 28, 1973 | [IL] | Israel | 5673 |
| Jul. 9, 1973 | [IL] | Israel | 5679 |
| Jul. 20, 1973 | [IL] | Israel | 42796 |

[51] Int. Cl.$^2$ .................................. E06B 9/24
[52] U.S. Cl. .................. 160/107; 160/84 R; 160/229 R; 296/97 E; 296/97 R
[58] Field of Search ............ 160/DIG. 2, DIG. 3, 160/DIG. 4, 10, 32, 34, 35, 87, 88, 89, 107, 114, 127–131, 134, 135, 220, 229, 230, 231 R, 231 A, 237, 350, 351, 352, 354, 368 R, 368 S, 84 R; 135/5 R; 256/25; 296/97 R, 97 C, 97 E, 97 F, 97 G, 97 H

[56] References Cited

U.S. PATENT DOCUMENTS

| 1,018,498 | 2/1912 | Ilse | 160/84 R |
| 1,252,766 | 1/1918 | Anderson | 108/35 |
| 1,307,437 | 6/1919 | Curry | 160/220 |
| 1,421,716 | 7/1922 | Randall | 160/35 |
| 1,944,696 | 1/1934 | Reichl | 160/231 R |
| 1,987,259 | 1/1935 | Koehler | 160/DIG. 3 |
| 2,305,677 | 12/1942 | Cotton | 296/97 A |
| 2,546,438 | 3/1951 | Grabill | 160/DIG. 2 |
| 2,560,762 | 7/1951 | Ghegan | 296/97 E |
| 2,599,014 | 6/1952 | Pritchard | 296/97 E |
| 2,651,543 | 9/1953 | Chonoski | 296/97 E |
| 2,715,042 | 8/1955 | Lancaster | 296/97 R |
| 2,804,135 | 8/1957 | Sutton | 160/DIG. 2 |
| 2,806,809 | 9/1957 | Schuh | 428/54 |
| 2,855,241 | 10/1958 | Walter | 160/23 R |
| 3,003,812 | 10/1961 | Haugland | 160/DIG. 2 |
| 3,192,784 | 7/1965 | Cayton | 74/89.15 |
| 3,627,272 | 12/1971 | Friedberg | 256/25 |
| 3,690,080 | 9/1972 | Dillard | 160/84 R |

FOREIGN PATENT DOCUMENTS

1088422 9/1960 Fed. Rep. of Germany ........ 229/14 C

Primary Examiner—Peter M. Caun
Attorney, Agent, or Firm—Benoit Law Corporation

[57] ABSTRACT

A foldable sunshield for motor vehicles comprises a plurality of planar rectangular elements which are joined along their longitudinal edges to form, in the stretched position, a substantially continuous partition and, in the folded position, a prismatic package, at least two planar rectangular elements being provided, in the preferred embodiment, with flap extensions. The sunshield may be used in combination with a window of a motor vehicle and devices, equipment or expedients for releasably retaining the sunshield at the window, such as a rear view mirror, sun visors, hooks, window edges and gaskets, the steering wheel, and the like.

26 Claims, 23 Drawing Figures

MOTOR VEHICLES AND SUNSHIELDS

CROSS-REFERENCE

This is a continuation-in-part of U.S. Pat. application Ser. No. 409,920, filed by the subject inventor on Oct. 26, 1973 for SUNSHIELD FOR MOTOR VEHICLES.

BACKGROUND OF THE INVENTION

1. Field of the Invention

This invention relates to sunshields and, more particularly, to sunshields or blinds for protecting the interior of motor vehicles against sun rays and blaze, and to motor vehicles and motor vehicle parts and equipment in combination with sunshields.

2. Prior Art Statement

Known sunshields for motor vehicles generally fall into two main categories: out-door and in-door. The out-door devices are comprised of an arcuate semi-transparent member mounted above the upper portion of the front window, thus filtering and shading part of the interior of the car only when the sun is at the higher part of its orbit.

The in-door means are either curtains or venetian blinds which are permanently affixed to the side or rear window frames, or, for the protection of the front window, plain flat sheets, and sun visors, including the type of visor proposed in U.S. Pat. No. 2,305,677 by A. P. Cotton, for cutting down glare from the sun, especially when caused by reflection from the hood of the automobile.

Since the chief purpose of the Cotton proposal is to cut down glare during driving, the elongated panels of that prior-art sun visor, like the slats of venetian blind or louvre type of automotive sunshields, ran horizontally; that is, across the window or from side to side thereof. This either requires that the sunshield be constructed so that it leaves sufficient space for the driver to see through the window, be it directly or through a rear-view mirror, or that special handware be employed and appropriately actuated by the driver to make sure that the sunshield extend to and remain in a desired active position and be also foldable or otherwise actuable to a passive or inactive position.

Both of these measures are needed in the proposal of Cotton, who does not want to cover the windshield beyond the line of vision of the driver and who employs selectively actuable hardware for maintaining the extended sun visor erect.

According to a proposal by G. A. Pritchard in U.S. Pat. No. 2,599,014, weather shields are fastened above automobile windows for the purpose of protecting the interior of the vehicle against the elements while providing for proper ventilation thereof. These weather shields at best offer only a very marginal protection against the rays of the sun, inasmuch as they are applied externally to the automobile structure and are, therefor, necessarily of limited depth.

Various existing folding boards, blinds, and similar structures have not been able to satisfy the long-standing need for an efficient and effective foldable sunshield for a motor vehicle and for an effective and efficient combination of such a shield and motor vehicle structure.

For instance, U.S. Pat. No. 1,252,766 by J. R. Anderson discloses a folding table with panels of varying or diverse width, but fails to teach or suggest any workable sunshield for motor vehicles. J. F. Curry in U.S. Pat. No. 1,307,437 discloses a game board rather than a motor vehicle structure and sunshield combination. E. Reichl in U.S. Pat. No. 1,944,696 and C. H. Schuh in U.S. Pat. No. 2,806,809 disclose folding panels and are similarly deficient as Curry.

R. J. Cayton in U.S. Pat. No. 3,192,784 discloses a vertical blind that would not be suitable for use in motor vehicles because of its bulk and its need for a type of mounting structure that would leave parts of the blind in the driver's field of vision.

A protective enclosure unit proposed by S. Friedberg in U.S. Pat. No. 3,627,272 is constructed in terms of suntanning and would be too bulky for efficient use and for easy storage in motor vehicles.

In German patent publication No. 1,088,422, H. Sieger discloses a corrugated cardboard sheet that has a series of corresponding apertures and is foldable in a spiral to provide a cavity for reception of one-half of a fragile object to be shipped. The corresponding apertures needed to make the Sieger shipping carton operative as taught, also would make that structure useless as a sunshield for motor vehicles.

Unless specifically stated to the contrary, the references herein cited are cited because of applicant's duty of disclosure, and are not represented as relevant to the claimed invention.

SUMMARY OF THE INVENTION

It is a general object of this invention to overcome the above mentioned disadvantages and satisfy the above mentioned needs.

It is a related object of this invention to provide improved sunshields for motor vehicles.

It is a germane object of this invention to provide improved combinations of sunshield and motor vehicle structures.

Other objects of this invention will become apparent in the further course of this disclosure.

From one aspect thereof, the subject invention resides in a motor vehicle and, more specifically, resides in the improvement comprising, in combination, a window having an outside, an inside, an upper margin and a lower margin, a foldable sunshield having a plurality of planar rectangular elements fabricated from substantially rigid sheet material and jointed to each other along longitudinal edges thereof, said sunshield having a compressed position for storage in a package and a stretched position at the inside of said window wherein the planar rectangular elements extend along and away from the lower margin of the window and said longitudinal edges extend at right angles to the lower margin of the window, and means for releasably retaining the sunshield at the window against the force of gravity while said longitudinal edges extend at right angles to the lower margin of the window.

From another aspect thereof, the subject invention resides in a motor vehicle and, more specifically, resides in the improvement comprising, in combination, a window having an outside, an inside, an upper margin and a lower margin, a ledge along the lower margin of said window on the inside thereof, and a foldable sunshield having a plurality of planar rectangular elements fabricated from substantially rigid sheet material and jointed to each other along longitudinal edges thereof and, a series of marginal sections resiliently jointed to said rectangular elements for supporting and extending on said ledge at an angle to said sunshield at said window, said sunshield having a compressed position for storage in a package and a stretched position covering said window at the inside thereof, with the planar rectangular elements extending from said ledge to the upper margin of said window at right angles to said lower margin of said window, and said marginal sections extending on said ledge at an angle to said rectangular elements to support said sunshield at said window.

From another aspect thereof, the subject invention resides in a motor vehicle and, more specifically, resides in the improvement comprising, in combination, a movable window having an outside, an inside and an uppwer margin, a gasket along the upper margin of the window, means for positioning the gasket for reception of the upper margin of the window in sealing engagement when the window is being closed, a foldable sunshield covering said window at the inside thereof and having a plurality of planar rectangular elements fabricated from substantially rigid sheet material and jointed to each other along the longitudinal edges thereof, said longitudinal edges extending at right angles to the upper margin of said window, at least two of said planar rectangular elements having flaps extending therefrom at the upper margin of said window and extending in between said upper margin and said gasket to the outside of said window, and means coupled to said window for moving said window toward said gasket and for releasably clamping said flaps between said upper margin and said gasket.

From another aspect thereof, the subject invention resides in a motor vehicle and, more specifically, resides in the improvement comprising, in combination, a window having an outside, an inside and an upper margin, and being movable between open and closed positions hooks at said upper margin of the window when said window is in its closed position, and a foldable sunshield covering said window when in its closed position at the inside thereof and having a plurality of planar rectangular elements fabricated from substantially rigid sheet material and jointed to each other along the longitudinal edges thereof, said longitudinal edges extending at right angles to the upper margin of said window, at least two of said planar rectangular elements having flaps extending therefrom at the upper margin and having openings configured thereon for receiving said hooks and appending the sunshield from said hooks.

The subject invention resides also in a foldable sunshield for motor vehicles comprising in combination a plurality of planar rectangular elements fabricated from substantially rigid sheet material having a plurality of folds dividing said sheet material into said planar rectangular elements jointed to each other through said folds along the longitudinal edges thereof, alternate of said folds biasing planar rectangular elements in a clockwise direction relative to adjacent planar rectangular elements, and the remaining folds biasing planar rectangular elements in a counterclockwise direction relative to adjacent planar rectangular elements, several of said planer rectangular elements having flaps contiguous with corresponding ends thereof along one side of said sunshield and exceeding in height the height of any portion of said sunshield between said flaps, said flaps having a total width less than the total width of said rectangular elements to thereby adapt said sunshield to be appended from a fitting of a motor vehicle and each of said flaps having an opening configured thereon to permit said sunshield to be appended from a hook fastened to the window of said motor vehicle.

The subject invention resides further in a foldable sunshield for motor vehicle windows comprising a plurality of planar rectangular solid imperforate elements made of a substantially rigid light-tight sheet material and jointed to each other along the longitudinal edges, said plurality of planar rectangular elements having varying width and being arranged in order of constantly increasing width so that said sunshield may be folded in a spiral form with the planar rectangular element having the narrowest width forming the center of the folded sunshield, and said sunshield being essentially as light-tight along said longitudinal edges where said planar rectangular solid imperforate elements are jointed, as said solid imperforate elements themselves.

The subject invention resides further in a foldable sunshield for motor vehicles comprising in combination a plurality of planar rectangular elements fabricated from substantially rigid sheet material having a plurality of folds dividing said sheet material into said planar rectangular elements jointed to each other through said folds along the longitudinal edges thereof, alternate of said folds biasing planar rectangular elements in a clockwise direction relative to adjacent planar rectangular elements, and the remaining folds biasing planar rectangular elements in a counterclockwise direction relative to adjacent planar rectangular elements, said sunshield being symmetrical relative to one of said folds and having a first flap extending transversely of two of said planar rectangular elements which have said one fold located therebetween and being selectively bendable and straightenable relative to said two planar rectangular elements, several of the remaining planar rectangular elements having further flaps contiguous with corresponding ends thereof along one side of said sunshield and exceeding in height the height of said first flap and of any portion of said sunshield between said further flaps.

BRIEF DESCRIPTION OF THE DRAWINGS

The subject invention and its various objects and aspects may become more readily apparent from the following detailed description of preferred embodiments thereof, illustrated by way of example in the accompanying drawings in which.

DESCRIPTION OF PREFERRED EMBODIMENTS

Figure 1:
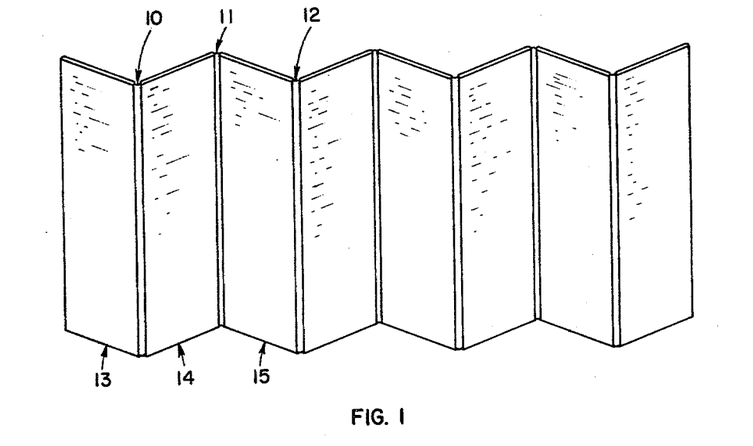
FIG. 1 is a perspective view of the basic form of sunshield or blind in its stretched state.

Turning to FIG. 1, there is illustrated the essential construction of the integral type of a sunshield according to a preferred embodiment of my invention. A corrugated cardboard blank has been processed to form thereon a plurality of indentation or impression lines constituting folds, as shown by folds 10, 11 and 12, which are equally spaced and parallel to each other, thereby forming a plurality of elements as shown by elements 13, 14 and 15. The folds are so performed that fold 10 tends to turn element 13 relative to element 14 in the clockwise direction, whereas fold 11 tends to turn element 14 relative to element 15 in the counterclockwise direction, and so forth. The result is that the sunshield may be folded together like the bellows of an accordion, to form the quadratic prism package as shown in FIG. 2.

In use, the sunshield is opened to assume the position shown in FIG. 1 and is stretched over the front window of a motor vehicle and is held there by the visors or by its inherent elasticity. The effective length of the sunshield may be adjusted to match the exact dimension of the front window. For removal, the visors are flipped upwardly and the sunshield compressed.

Alternatively and especially in the case where the sunshield is fabricated from an integral board and the folds are formed through processing the board between pairs of rollers, or by a die, due to the flexibility of the sunshield in the orthogonal direction, it may hold itself in a partly upright position by just sticking it into the acute angled corner which usually exists between the cover of the dashboard and the windshield.

Figure 2:
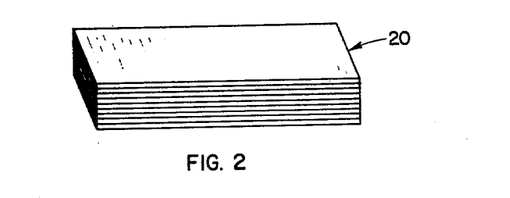
FIG. 2 is a perspective view of the sunshield or blind of FIG. 1 in its folded position.

After use, the sunshield is folded into the position 20 of FIG. 2, and put away. If necessary to hold the package together against any springiness in the folds, it may be wrapped with a strip of rubber or other suitable holding means such as a detachably attachable sleeve or container (not shown).

Figure 3:
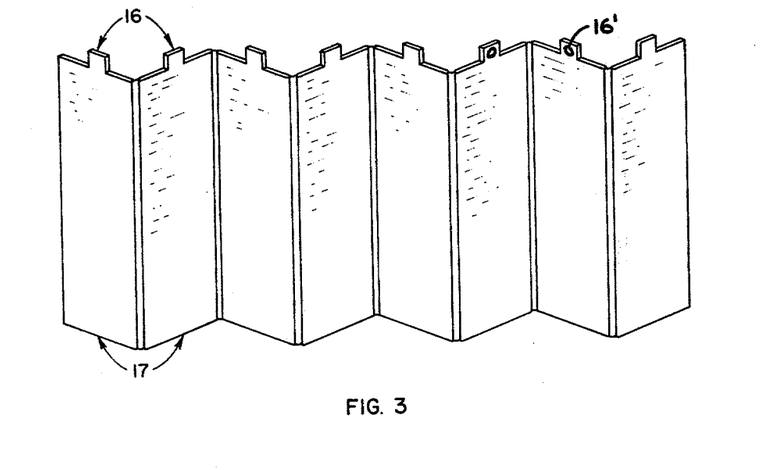
FIG. 3 is a perspective view of the sunshield or blind of FIG. 1 with a plurality of flaps provided for window applications.
Figure 4:
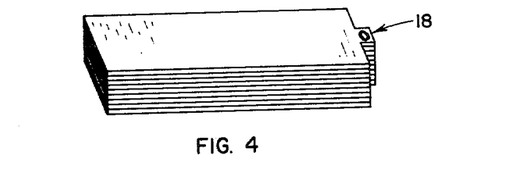
FIG. 4 is a perspective view of the sunshield or blind of FIG. 3 in its folded position.

The sunshield of FIGS. 3 and 4 differs from the embodiment of FIGS. 1 and 2 by the provision of flaps 16 which extend from each element 17 for the purpose of clamping the sunshield between the glass and the frame of the door when the window is closed thereon. The flaps 16 which are shown are made integral with the elements 17, may also be made of some different, preferably elastic material and fixed to the elements 17. Or, alternatively, the flaps, as shown at 16', may constitute eyelets adapted to be slung over suitable hooks which ride over the rim of the window or are attached to the window by suction cups (see FIGS. 17-19).

To install the sunshield, it is held first by hand against the glass, the windows are lowered to a small extent in order to allow the flaps to be bent outwards through the slit formed between the upper rim of the glass and the frame of the window. Then the windows are closed, the flaps become clamped and the sunshield as a whole remains suspended thereon to completely cover the windows.

Figure 5:
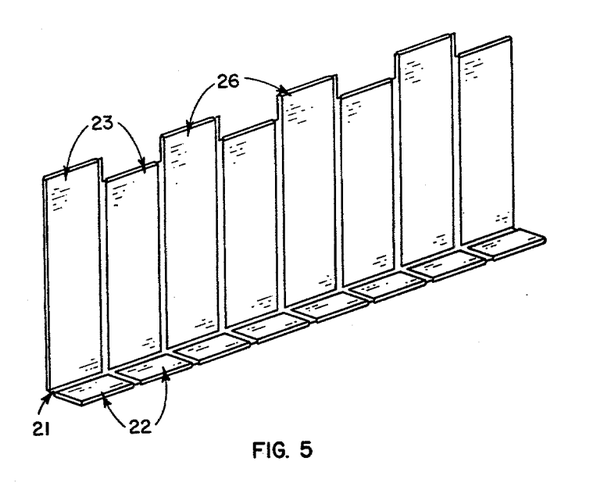
FIG. 5 is a perspective view of a sunshield or blind according to a preferred embodiment of the present invention which includes a series of transversely foldable margin portions or marginal sections to allow adaptibility to front, side or rear window applications.
Figure 6:
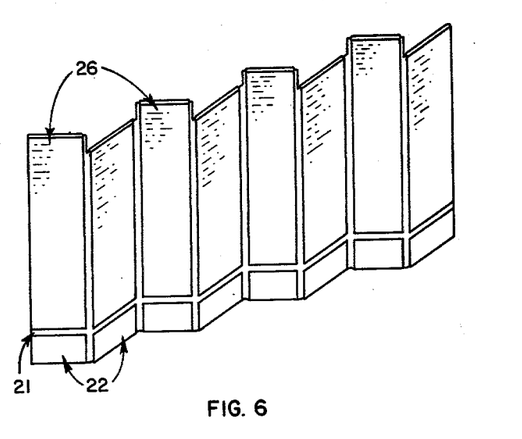
FIG. 6 is a perspective view of the sunshield or blind of FIG. 5 in a semi-folded position.
Figure 7:
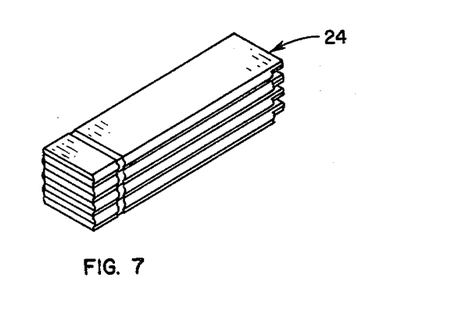
FIG. 7 is the sunshield or blind of FIGS. 5 and 6, in its folded position.

FIGS. 5 to 7 show a still further advanced modification of the sunshield according to my invention. By forming a transverse indentation or fold 21, a series of marginal portions or sections 22 is formed. Upon folding the marginal sections 22 to a position perpendicular or similarly angular to the major plane of the sunshield as shown in FIG. 5, the latter is automatically stretched and locked in such position as long as it is not turned, either downwards or upwards, to the plane of elements 23. To prevent this, angle-pieces or blocks (not shown) may have to be attached in either sides of the intersection between the two series of elements 22 and 23.

FIG. 6 shows the sunshield in an intermediate position, i.e. before stretching is effected by folding the marginal portions or sections as explained above, and FIG. 7 shows the same in the completely folded position 24.

It will be noted that in the embodiment of FIGS. 5, 6 and 7, the flaps 26 are differently shaped and appear only on every second one of the elements. In either case, the flaps 18 and 26 exceed in height the height of any portion of the sunshield between these flaps, as is clearly apparent from FIGS. 3 to 7.

Figure 8:
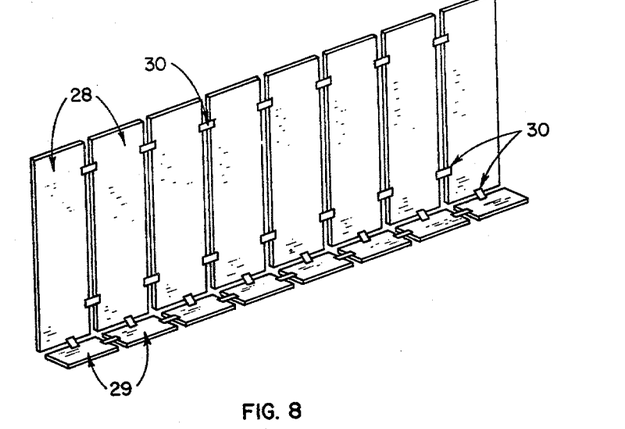
FIG. 8 is a perspective view of an embodiment of the sunshield or blind according to a preferred embodiment of the present invention in which the individual structural elements are hinged together.

FIG. 8 shows a sunshield similar to that shown in FIGS. 5 to 7 and described above. However, the elements 28 as well as elements 29 are not formed integrally with each other by being all embossed out of the same sheet material, but they are separately fabricated, discrete elements assembled together by hinge members 30. The hinges may be made of strips of any yieldable material such as cloth, leather or suitable plastics, and they may be sewn, stapled, glued or otherwise affixed at the appropriate locations, such as are shown in the figure. In all other respects the sunshield according to this embodiment functions the same as the other embodiments. The embodiments of FIGS. 1 to 7 are presently preferred over the embodiment of FIG. 8.

As stated above, the sunshield according to the embodiments of either FIG. 5 or FIG. 8 may be readily used as protection against sun rays emanating through the rear window. Since usually no fittings, accessories or the like, which may in some way be utilized to hold the sunshield in an upright position, are available, the sunshield must be so designed as to be self-supported. The marginal sections or portions 22 and 29 satisfy this requirement.

Figure 9:
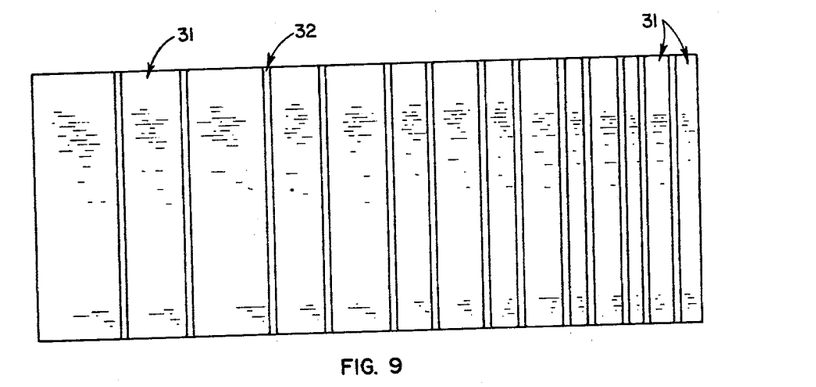
FIG. 9 is an elevation of a sunshield or blind according to a preferred embodiment of the subject invention and foldable in a spiral form.
Figure 10:
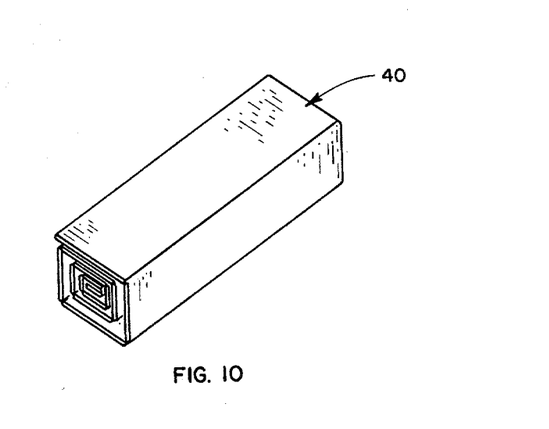
FIG. 10 is a perspective view of the sunshield or blind of FIG. 9 in its spirally folded form.

FIGS. 9 and 10 show a still further embodiment modified in respect to the sunshield of FIGS. 1 and 2 by the manner in which it is collapsible. The sunshield of FIGS. 9 and 10 is essentially constituted by a plurality of planar rectangular solid imperforate elements 31 made of a substantially rigid, light-tight sheet material and jointed to each other along the longitudinal edges 32, where the elements 31 may be parted from each other by indentation lines. The width of each element and the direction of the folds 32 are so designed that in folding the sunshield together in a spiral manner with the narrowest elements being folded first, the sunshield gets into the required shape of rectangular box 40, as shown in FIG. 10. In other words, the plurality of planar rectangular elements have varying width and are arranged in order of constantly increasing width so that the sunshield may be folded in a spiral form as seen in FIG. 10, with the planar rectangular element 31 having the narrowest width forming the center of the folded sunshield. To render the sunshield of FIG. 9 as effective as possible, the same is essentially as light-tight along the longitudinal edges 32 where the planar rectangular solid imperforate elements 31 are jointed, as the solid imperforate elements 31 themselves.

It is evident that all sunshields according to any of FIGS. 1, 8 or 9 may be provided with suspending means such as flaps 16 or 26 shown in FIGS. 3 and 5, respectively, of whatever shape, and/or with a transverse fold, as shown by fold 21 in FIG. 5.

It will be now readily appreciated that the invention provides a very simple but highly effective solution to the problem of protecting the interior of the car against the damages caused by sun rays and blaze, and thereby satisfies a long felt need of motor vehicle drivers and owners. In addition, the sunshield may on its exterior surface be imprinted with a commercial slogan for advertising, decorative, or promotional purposes.

The complete sunshield is preferably made of corrugated cardboard or plastic, that ensures both mechanical stiffness and heat insulation properties. However, it may be fabricated from other kinds of cardboard, of hard paper or any other board of insulation material or it may be molded of plastic material, preferably coated with heat reflecting, semi-transparent materials such as white paint or aluminum foil.

Alternatively, if the sunshield is assembled of discrete elements, as described above, the elements may be made of the above mentioned materials and also of veneers.

When not in use, e.g. while the car is driven, the sunshield is knocked-down or folded to form a neat, space-saving package, preferably wrapped by a rubber loop. Furthermore, a small sleeve or container may be provided to store the sunshield while it is not in use. Such a container could be detachably attached to a motor vehicle door or to the underside of the dashboard.

FIGS. 11 to 23 show various combinations of sunshields and motor vehicle structure according to further preferred embodiments of the subject invention.

Figure 11:
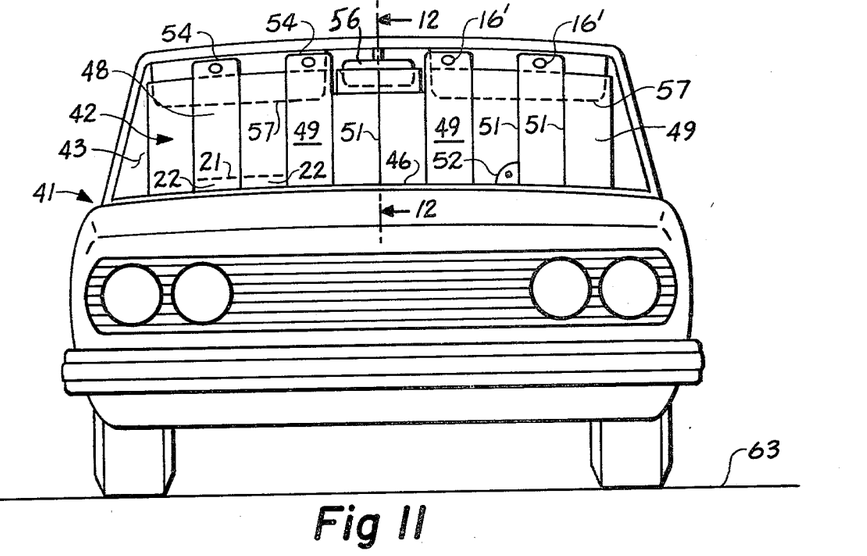
FIG. 11 is a perspective front view of a motor vehicle structure and sunshield combination in accordance with a further preferred embodiment of the subject invention.
Figure 12:
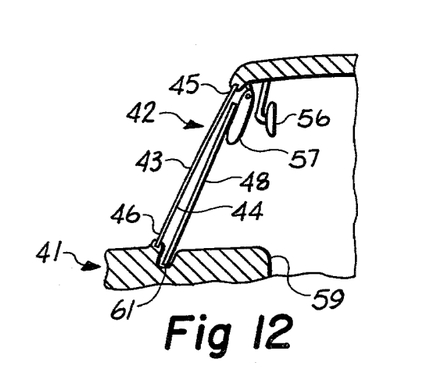
FIG. 12 is a partial section taken on the line 12—12 in FIG. 11.

The motor vehicle 41, according to FIGS. 11 and 12, includes in its structure a window 42 having an outside 43, and inside 44, an upper margin 45 and a lower margin 46, as best seen in FIG. 12.

A foldable sunshield 48 is located at the inside 44 of the window 42 and has a plurality of planar rectangular elements 49 fabricated from substantially rigid sheet material and extending along and away from the lower margin 46 of the window 42. The rectangular element 49 are jointed to each other along longitudinal edges 51 thereof, extending at right angles to the lower margin 46 of the window 42, as shown in FIG. 11 at 52.

In FIGS. 11 and 12, the window 42 is a windshield. It should, however, be understood that the combination just disclosed may also be realized with side or rear windows, as will become more fully apparent in the further course of this disclosure.

Figure 13:
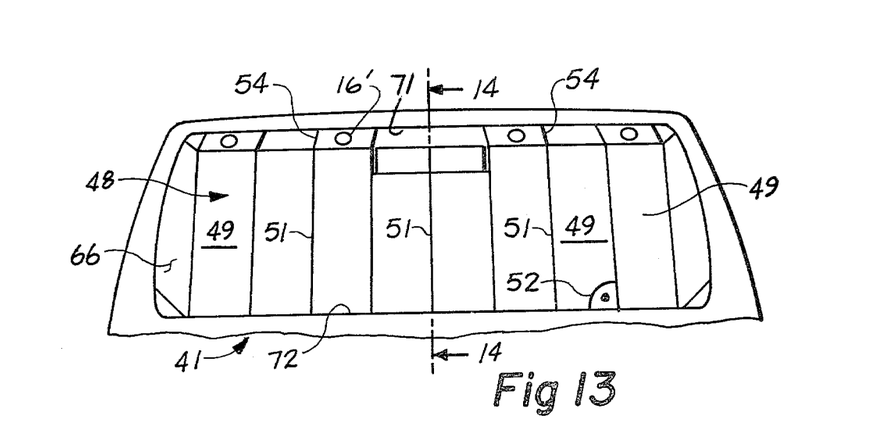
FIG. 13 is a partial rear view of the vehicle structure of FIG. 11.

The sunshield 48 may be one of the sunshields disclosed above in connection with FIGS. 1 to 10. I presently prefer the types of sunshields shown in FIGS. 11 to 22 for their universal applicability to front, side and rear windows. sunshield In particular, the sunshield 48 according to FIGS. 11 and 13 is symmetrical relative to the central fold 51 which, in FIGS. 11 and 13 coincides with the section line 12—12 and 14—14, respectively. As in the case of the sunshields shown in FIGS. 1 to 7, the sunshield 48 has folds along the longitudinal edges 51. Alternate of these folds bias planar rectangular elements 49 of the sunsheild 48 in a clockwise direction relative to adjacent planar rectangular elements, and the remaining folds bias planar rectangular elements in a counterclockwise direction relative to adjacent planar rectangular elements. In this manner, the sunshield 48 may be folded together like the bellows of an accordion, to form the type of quadratic prism package shown in FIGS. 2, 4 and 7. Also, the kind of biasing of the panels 49 just described permits the sunshield 48, and other sunshields possessing that biasing feature, to be used in a semifolded or extended accordion fashion which imparts a vertical self-supporting rigidity to the sunshield that is not possessed by mere flat or disjointed sheets or panels, such as the hinged panels shown in the above mentioned Cotton proposal.

Several of the planar rectangular elements 49 also have flaps 54 contiguous with corresponding ends thereof along one side of the sunshield and exceeding in height the height of any portion of the sunshield between the flaps 54. As will be more fully explained in connection with FIGS. 15 and 16, the flaps 54 are useful, for instance, in installing and retaining the sunshield 48 at side windows.

Figure 17:
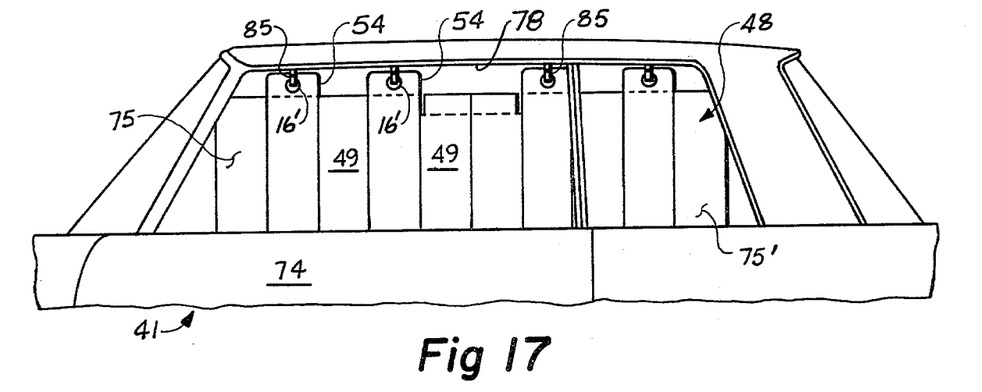
FIG. 17 is a view similar to FIG. 15, showing a modification in accordance with a further preferred embodiment of the subject invention.
Figure 18:
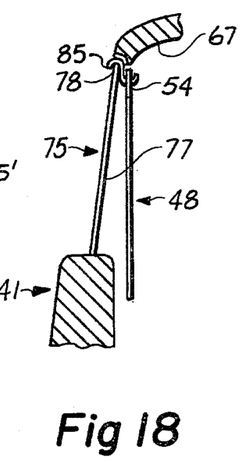
FIG. 18 is a view of a detail of the vehicle structure of FIG. 17.

As in the case of the sunshield according to FIGS. 3 and 4, the sunshield 48 may have apertures 16' in its flaps 54 for a suspension of the sunshield by hooks as more fully disclosed in FIGS. 17 to 18.

According to FIG. 11, the panels 49 immediately adjacent the central fold 51 at the section line 12—12 are free of the flaps 54. On the other hand, each of the second and fourth planar rectangular elements 49 on each side of the central fold 51 has a flap 54. The lack of flaps 54 at the panels 49 immediately adjacent the central fold 51 facilitates the installation of the sunshield 48 without interference with the rear view mirror 56 located inside the vehicle in the driver's view.

The sunshield and motor vehicle structure combinations herein disclosed also have means for releasably retaining the sunshield at the particular window. For instance, the means for releasably retaining the sunshield in FIGS. 11 and 12 include a sun visor 57 which, when swung from its retracted upper position to its active lower position shown in FIGS. 11 and 12, contacts and releasably retains the sunshield 48 at the upper margin 45 of the window 42. Lowering the sun visor 57 (even either one of them) holds any sunshield against that sunvisor.

In practice, this will usually retain the sunshield along the entire window, inasmuch as most vehicles have two sun visors 57 as seen in FIG. 11. Alternatively or additionally, the rear view mirror 56 may serve as a means for releasably retaining the sunshield at the window, as will be more fully shown with the aid of FIGS. 21 and 22.

The vehicle dashboard 59 may also serve as a means for supporting or releasably retaining the sunshield. Where the dashboard, as shown in FIG. 12 has or provides an elongate recess 61 along the lower margin of the window 46 on the inside thereof, the sunshield may conveniently be inserted into that recess 61 to extend in and along that recess or slot at the lower margin of the sunshield.

As seen in FIG. 11, the flaps 54 have a total width less than the total width of the rectangular element 49. In other words, even though each flap 54 may be as wide as its corresponding panel 49, the number of flaps 54 is less than the number of panels. This renders the sunshield easier to install especially at side windows, but still provides sufficient means for effectively suspending the sunshield.

Convenient installation and retention of installed position of the sunshield according to preferred embodiments of the subject invention are realized by the illustrated orientation of the rectangular panels at the installed sunshield.

For instance, FIG. 11 shows that the planar rectangular elements 49, with their longitudinal edges or folds 51, extend at right angles 52 to the lower edge or margin 46 of the car window. In other words, the sunshield elements or panels 49 extend with their longitudinal dimension at right angles to the essentially horizontal road surface 63 on which the vehicle 41 rests while the sunshield is in place. In this manner, the force of gravity acting on the panels or elements 49 is essentially parallel to the longitudinal edges or folds 51 whereby it cannot collapse the sunshield panels 49 relative to each other. The subject invention thus conveniently avoids a vexing problem of prior-art structures which required special hardware or other suspending structure for retaining the extended panels in position relative to one another.

As indicated at 21 for two of the panels in FIG. 11, the sunshield 48 may have a fold extended transversely across the planar rectangular elements 49 and the longitudinal edges or folds 51 and forming a series of marginal sections 22 along a lower margin of the sunshield for selectively stiffening and supporting the remainder of the sunshield, as has already been explained above in connection with FIGS. 5 to 7. If desired, this feature may be employed for supporting the sunshield on the dashboard 59 at the windshield or front window.

More typically, however, the marginal sections 22 are used to support the windshield 48 on the ledge 65 at the rear window 66 of the vehicle 41. In practice, the fact that the marginal sections 22 are mutually interconnected, as seen in FIG. 5, greatly enhances the stiffening effect of these sections on the main proper of the sunshield 48, when the sections 22 are made to extend at an angle to the remainder of the sunshield as shown in FIG. 14.

Figure 14:
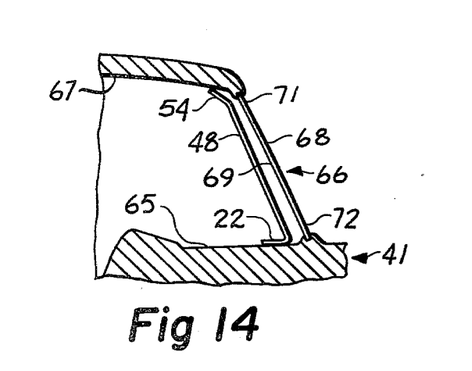
FIG. 14 is a partial section taken on the line 14—14 in FIG. 13.

As also shown in FIG. 14, the upper flaps 54 may be used as anchors relative to the ceiling 67 of the vehicle 41 when the sunshield is installed by squeezing it towards the rear window 56. Reference may in this respect also be had to FIG. 13 which shows an elevation of the rear window 66 with installed sunshield 48. As the windshield 42, the rear window 66 also has an outside 68, an inside 69, an upper margin 71 and a lower margin 72.

According to FIGS. 13 and 14, the windshield 48 is located at the inside 69 of the rear window 66 and the longitudinal edges 51 extend at right angles 52 to the lower window edge 72. This again presents the longitudinal edges or folds 51 essentially at right angles to the force of gravity acting on the sunshield 48, thereby preventing the panels 49 from collapsing relative to one another.

Figure 15:
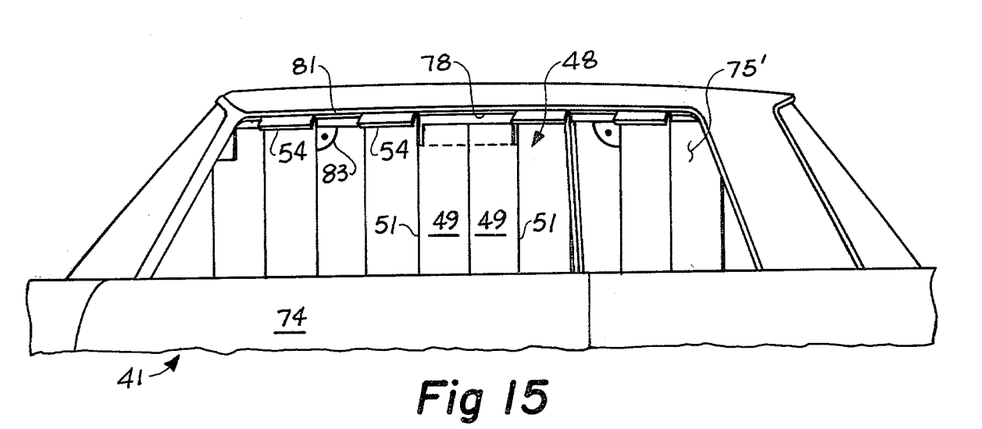
FIG. 15 is part of a side view of the vehicle structure of FIG. 11.
Figure 16:
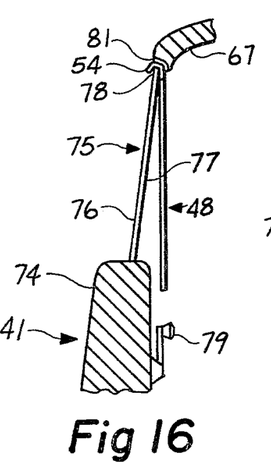
FIG. 16 is a view of a detail of the vehicle structure of FIG. 15.

As seen in FIGS. 15 and 16, the motor vehicle 41 has a door 74 with a movable window 75 having an outside 76, an inside 77 and an upper margin 78.

The window 75 is actuable by a hand crank 79 or an equivalent mechanical or electrical device between open and closed positions.

At the ceiling or roof 67, the vehicle has a rubber or elastomeric gasket 81 for receiving the upper edge or margin 78 of the window 75 in sealing engagement when the window is being closed by rotation of the crank 79. In other words, the gasket 81 then extends along the upper margin of the window 75.

As seen in FIGS. 15 and 16, when viewed jointly, at least two of the planar rectangular elements 49 of the sunshield 48 have flaps 54 extending therefrom at the upper margin 78 of the window 75, 75' and extending in between that upper margin and the gasket 81 to the outside 76 of the window, when the window 75 has been moved toward the gasket 81 with the flaps 54 located between the upper window margin 78 and the gasket 81 and the bulk of the panel 48 located at the inside 77 of the window. In this manner, the crank 78 or equivalent structure acts as a means coupled to the window 75 for releasably clamping the flaps 54 between the upper window margin 78 and the gasket 81.

As in the other embodiments, the sunshield 48, which covers the side window 75 at the inside 77 thereof, has its longitudinal edges 51 extending at right angles to the force of gravity or, in other words, at right angles 83 to the upper edge or margin 78 of the window.

In vehicles having doors equipped with window frames, the gasket 81 may extend along the upper horizontal portion of the frame of the particular window, thereby meeting the requirement that the gasket extend "along the upper margin of the window".

The motor vehicle or automobile according to FIG. 15 also has a second side window 75' which is movable between open and closed positions and which, in every other respect, is similar to the side window 75 in its clamping and sunshield mounting functions.

The preferred embodiment of FIGS. 17 and 18 is closely similar to the preferred embodiment of FIGS. 15 and 16, except that the sunshield 48 is suspended at the inside of the side windows 75 and 75' by a number of hooks 85 extending through the apertures 16' in the flaps 54 and being slung over the upper edge or margin 78 of the side windows 75 and 75', as seen in FIGS. 17 and 18, which show the hooks 85 suspended from the upper margins 78 of the side windows.

Figure 19:
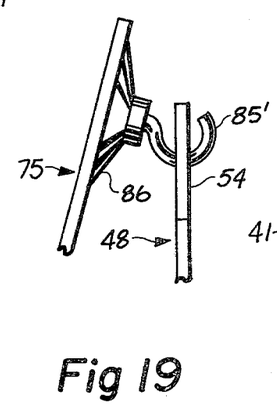
FIG. 19 illustrates a modification in accordance with the subject invention.

Alternatively, and as shown in FIG. 19, the sunshield 48 at its apertured flaps 54 may be suspended on hooks 85' which are attached to or carried by suction cups 86 that are releasably attached to the window 75 by the vacuum created thereby. If desired, suction cups 86 with hooks 85' may also be employed to suspend the sunshield 48 at the windshield or front window 42 or the rear window 66. The arrangements shown in FIGS. 11 to 14 are, however, presently preferred.

The sunshield 48 (or 48') may also be employed in vehicles having windows equipped with side hinges and opening to the outside, or to the inside, for that matter. In that case, the sunshield may be clamped by such a window swinging about its side hinge toward a closed position.

Also, the apertures 16' may be provided in places of the sunshield other than the flaps 54.

Figure 20:
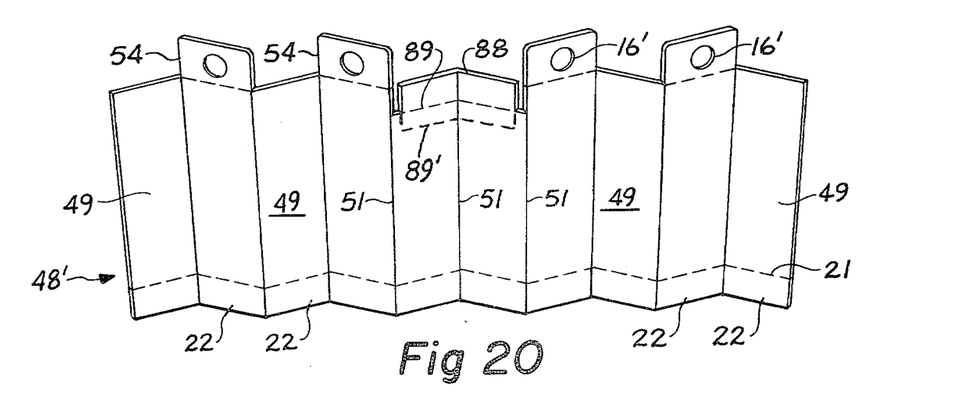
FIG. 20 is a perspective view of a sunshield in accordance with a further preferred embodiment of the subject invention.

A sunshield 48' according to my presently most preferred embodiment is shown in FIG. 20. The sunshield 48' is closely similar or identical to my sunshield 48, except that it has a flap 88 situated at the location of the rear view mirror 76 (see FIGS. 21 and 22) and bendable relative to the remainder of the sunshield to permit movement of the sunshield past the rear view mirror when the flap 88 is bent during installation of the sunshield.

As seen in FIG. 20, the special flap 88 is elongate and extends at right angles to the longitudinal edges or folds 51 of the sunshield.

In practice, the special flap 88 may be thought of as a first flap and the previously disclosed flaps 54 may be thought of as further flaps. In that case, it may be said that the first flap 88 extends transversely of two of the planar rectangular elements 49 which have the above mentioned fold 51 extending along the line of symmetry of the sunshield located therebetween, or, in other words, which are immediately adjacent to that fold or line of symmetry.

Figure 21:
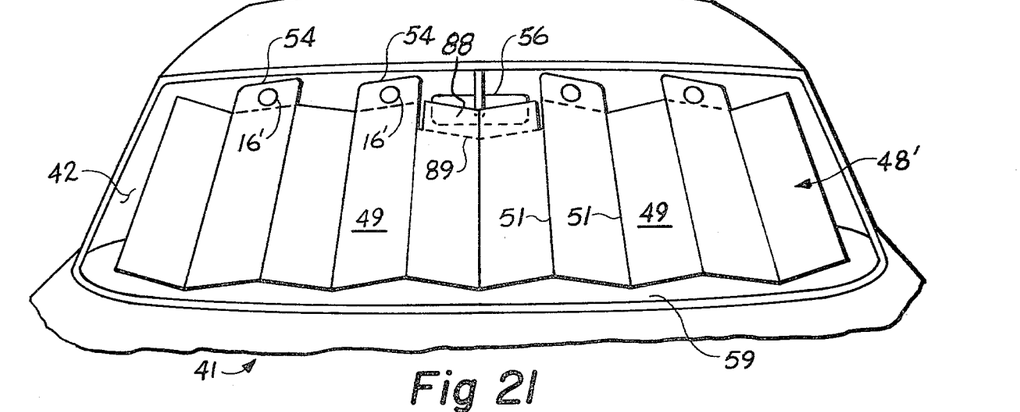
FIG. 21 is a perspective front view of part of a motor vehicle structure in combination with a sunshield according to FIG. 20.

As seen in FIGS. 20 and 21, the further flaps 54 exceed in height the height of the first flap 88 and of any portion of the sunshield 48' between the further flaps 54. In the illustrated preferred embodiment, the upper edge of the first flap 88 is level with the upper edges of the third planar rectangular elements 49 on both sides of the line of symmetry or one central fold 51 of the sunshield 48'.

If desired, the upper edge of the first flap 88 may be made lower than the upper edges of the third elements 49. Also, the first flap 88 generally may extend transversely on both sides of the line of symmetry of the sunshield for a distance of less, or more, than the width of two elements 49.

As indicated by a score line 89, the first flap 88 is selectively bendable and straightenable relative to the two central planar rectangular elements across which it extends.

Figure 22:
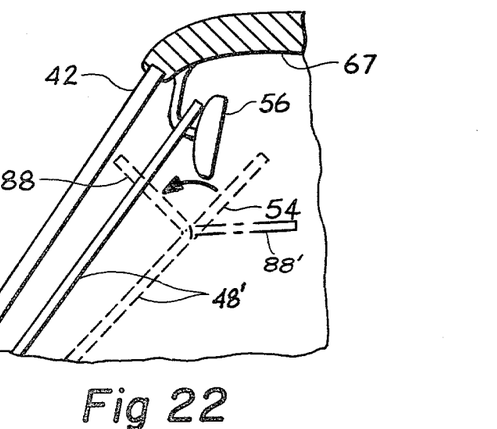
FIG. 22 is a partial side view, in section, of the motor vehicle structure according to FIG. 21.

As seen in FIG. 22, the first flap 88 is bent or swung relative to the remainder of the sunshield 48' when the shield is moved past the rear view mirror 56 during installation of the sunshield. In this manner, the rear view mirror need not be disturbed by the installation of the shield. When the sunshield has assumed its position at the inside of the windshield or front window 42, the first flap 88 is straightened or bent back into alignment with the sunshield elements or panels 49 and flaps 54. The rear view mirror 56 then contacts the first flap 88 and releasably retains the sunshield 48' at the flap 88 and windshield 42 when the flap 88 has been straightened.

In many instances, the rear view mirror 56 will in this manner be able to support the sunshield 48' by itself. This is particularly the case when the sunshield, as shown in FIG. 21, rests on the dashboard 59 while being in a semi-folded or extended accordion configuration. The extended accordion configuration is distinct from the folded accordion configuration shown in FIGS. 2, 4 and 7, but is also distinct from a completely extended position where all the panels 49 would be in one plane, thereby obliterating the accordion configuration of the sunshield panels or elements.

If desired, more than one score line, such as an additional score line 89' (FIG. 20), may be provided to permit accommodation of the sunshield to different rear-view mirror sizes and kinds.

As long as the rectangular sunshield panels or elements 48 extend in an accordion fashion relative to each other via folds 51, the sunshield will have an inherent vertical stiffness inhibiting its collapse.

Figure 23:
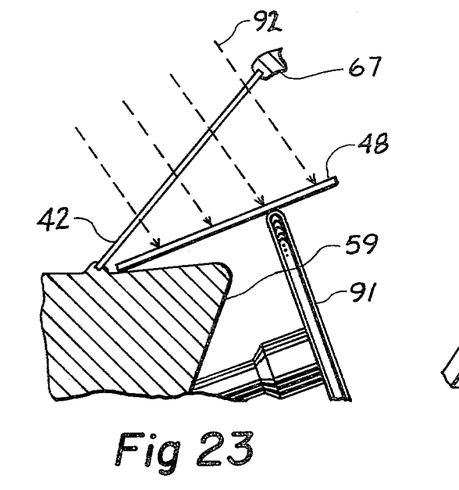
FIG. 23 is a view similar to FIG. 12 showing a modification in accordance with a further preferred embodiment of the subject invention.

In some instances means other than the ones so far disclosed may be employed for supporting the sunshield. As shown, by way of example, in FIG. 23, the sunshield may be supported or releasably retained by the steering wheel 91 of the motor vehicle. This is particularly the case if the steering wheel is comparatively high relative to the dashboard 59 or if the motor vehicle is equipped with a tiltable steering wheel. As seen in FIG. 23 the sunshield 48 is able to catch the rays 92 of the sun even if it is only supported by the dashboard and steering wheel. This solution may thus be sufficient in cases where the rays of the sun only get hot after the sun has obtained a position considerably above the horizon. However, I presently prefer the embodiments shown in FIGS. 11, 12, 21 and 22.

In principle, the sunshield shown in FIGS. 9 and 10 may be employed in combination with the motor vehicle structure in lieu of the sunshield 48 or 48'. In that case, the longitudinal edges or folds 32 between the panels of varying or diverse width would be oriented to extend at right angles to the upper or lower window margin or, in other words, essentially at right angles to the force of gravity acting on the sunshield.

Again, I prefer use of the sunshield 48 and especially of the sunshield 48' to an employment of the spiral type of sunshield structure shown in FIGS. 9 and 10.

In practice, the first flap 88 need not necessarily be bent forward as shown in FIG. 22, but may be bent backward (see 88') so that it will trail the remainder of the sunshield, when the sunshield is moved past the rear view mirror 56. As the sunshield is being pushed toward the window 42, the backwardly bent flap 88 is straightened and moved behind the rear view mirror 56 which then releasably retains the sunshield via flap 88.

My subject extensive disclosure will suggest or render apparent various modifications and variations within the spirit and scope of my subject invention to those skilled in the art.

I claim:

1. In a motor vehicle, the improvement comprising in combination:
   a window having an outside, an inside, an upper margin and a lower margin;
   a foldable sunshield having a plurality of planar rectangular elements fabricated from substantially rigid sheet material and jointed to each other along longitudinal edges thereof, said sunshield having a compressed position for storage in a package and a stretched position at the inside of said window wherein the planar rectangular elements extend along and away from the lower margin of the window and said longitudinal edges extend at right angles to the lower margin of the window; and means for releasably retaining the sunshield at the window against the force of gravity while said longitudinal edges extend at right angles to the lower margin of the window.

2. A motor vehicle as claimed in claim 1, wherein: said means for releasably retaining the sunshield include a sun visor swingable from a retracted upper position to an active lower position and contacting and releasably retaining the sunshield at the upper margin of the window in said active lower position.

3. A motor vehicle as claimed in claim 1, wherein: said planar rectangular elements extend in an extended accordion fashion relative to each other to provide the sunshield with a self-suppporting stiffness while said longitudinal edges extend at right angles to the lower margin of the window.

4. A motor vehicle as claimed in claim 1, wherein: said means for releasably retaining the sunshield include a steering wheel in said motor vehicle for supporting the sunshield near the window.

5. A motor vehicle as claimed in claim 1, including: means for providing an elongate recess along the lower margin of the window on the inside thereof, with said sunshield extending in and along said recess at a lower margin thereof.

6. A motor vehicle as claimed in claim 1, wherein: said sunshield has folds along said longitudinal edges, alternate of said folds biasing planar rectangular elements of said sunshield in a clockwise direction relative to adjacent planar rectangular elements, and the retaining folds biasing planar rectangular elements in a counterclockwise direction relative to adjacent planar rectangular elements.

7. A motor vehicle as claimed in claim 1, wherein: several of said planar rectangular elements have flaps contiguous with corresponding ends thereof along one side of said sunshield and exceeding in height the height of any portion of said sunshield between said flaps.

8. A motor vehicle as claimed in claim 7, wherein: said flaps have a total width less than the total width of said rectangular elements.

9. A motor vehicle as claimed in claim 7, wherein: each of said flaps has an opening configured thereon to permit said sunshield to be appended from a hook fastened to a part of the motor vehicle.

10. A motor vehicle as claimed in claim 1, wherein: said planar rectangular elements have varying width and are arranged in order of constantly increasing width so that said sunshield may be folded in a spiral form before and after positioning at said window, with the planar rectangular element having the narrowest width forming the center of the folded sunshield.

11. A motor vehicle as claimed in claim 1, wherein: said sunshield has a fold extending transversly across said planar rectangular elements and longitudinal edges and forming a series of marginal sections along a lower margin to the sunshield for selectively stiffening and supporting the remainder of the sunshield.

12. A motor vehicle as claimed in claim 11, wherein: said marginal sections are mutually interconnected and extend at an angle to the remainder of the sunshield.

13. In a motor vehicle, the improvement comprising in combination:
a window having an outside, an inside, an upper margin and a lower margin;
a ledge along the lower margin of said window on the inside thereof; and
a foldable sunshield having a plurality of planar rectangular elements fabricated from substantially rigid sheet material and jointed to eaach other along longitudinal edges thereof and a series of marginal sections resiliently jointed to said rectangular elements for supporting said sunshield at said window, said sunshield having a compressed position for storage in a package and a stretched position covering said window at the inside thereof, with the planar rectangular elements extending from said ledge to the upper margin of said window at right angles to said lower margin of said window, and said marginal sections extending on said ledge at an angle to said rectangular elements to support said sunshield at said window.

14. A motor vehicle as claimed in claim 13, wherein: said marginal sections are mutually interconnected to stiffen said sunshield when extending at an angle to said rectangular elements.

15. A motor vehicle as claimed in claim 13, wherein: said sunshield has folds along said longitudinal edges, alternate of said folds biasing planar rectangular elements of said sunshield in a clockwise direction relative to adjacent planar rectangular elements, and the remaining folds biasing planar rectangular elements in a counterclockwise direction relative to adjacent planar rectangular elements.

16. A motor vehicle as claimed in claim 13, wherein: several of said planar rectangular elements have flaps contiguous with corresponding ends thereof along one side of said sunshield and exceeding in height the height of any portion of said sunshield between said flaps.

17. A motor vehicle as claimed in claim 13, wherein: said flaps have a total width less than the total width of said rectangular elements.

18. A motor vehicle as claimed in claim 13, wherein: each of said flaps has an opening configured thereon to permit said sunshield to be appended from a hook fastened to a part of the motor vehicle.

19. In a motor vehicle, the improvement comprising in combination:
a movable window having an outside, an inside and an upper margin;
a gasket along the upper margin of the window;
means for positioning the gasket for reception of the upper margin of the window in sealing engagement when the window is being closed;
a foldable sunshield covering said window at the inside thereof and having a plurality of planar rectangular elements fabricated from substantially rigid sheet material and jointed to each other along the longitudinal edges thereof, said longitudinal edges extending at right angles to the upper margin of said window, at least two of said planar rectangular elements having flaps extending therefrom at the upper margin of said window and extending in between said upper margin and said gasket to the outside of said window; and means coupled to said window for moving said window toward said gasket and for releasably clamping said flaps between said upper margin and said gasket.

20. A motor vehicle as claimed in claim 19, wherein:
said sunshield has folds along said longitudinal edges, alternate of said folds biasing planar rectangular elements of said sunshield in a clockwise direction relative to adjacent planar rectangular elements, and the remaining folds biasing planar rectangular elements in a counterclockwise direction relative to adjacent planar rectangular elements.

21. A motor vehicle as claimed in claim 19, wherein:
said sunshield has a fold extending transversely across said planar rectangular elements and longitudinal edges and forming a series of marginal sections along a lower margin to the sunshield for selectively stiffening and supporting the remainder of the sunshield.

22. A motor vehicle as claimed in claim 19, wherein:
said marginal sections are mutually interconnected and extend at an angle to the remainder of the sunshield.

23. In a motor vehicle, the improvement comprising in combination:
a window having an outside, an inside and an upper margin and being movable between open and closed positions;
hooks at said upper margin of the window when said window is in its closed position; and
a foldable sunshield covering said window when in its closed position at the inside thereof and having a plurality of planar rectangular elements fabricated from substantially rigid sheet material and jointed to each other along the longitudinal edges thereof, said longitudinal edges extending at right angles to the upper margin of said window, at least two of said planar rectangular elements having flaps extending therefrom at the upper margin and having openings configured thereon for receiving said hooks and appending the sunshield from said hooks.

24. A motor vehicle as claimed in claim 23, wherein:
said hooks are suspended from the upper margin of said window.

25. A motor vehicle as claimed in claim 23, including:
suction cups releasably attached to said window and carrying said hooks.

26. A foldable sunshield for motor vehicles comprising in combination a plurality of planar rectangular elements fabricated from substantially rigid sheet material having a plurality of folds dividing said sheet material into said planar rectangular elements jointed to each other through said folds along the longitudinal edges thereof, alternate of said folds biasing planar rectangular elements in a clockwise direction relative to adjacent planar rectangular elements, and the remaining folds biasing planar rectangular elements in a counterclockwise direction relative to adjacent planar rectangular elements, several of said planar rectangular elements having flaps contiguous with corresponding ends thereof along one side of said sunshield and exceeding in height the height of any portion of said sunshield between said flaps, said flaps having a total width less than the total width of said rectangular elements to thereby adapt said sunshield to be appended from a fitting of a motor vehicle and each of said flaps having an opening configured thereon to permit said sunshield to be appended from a hook fastened to the window of said motor vehicle.

* * * * *

REEXAMINATION CERTIFICATE (2898th)
United States Patent [19]
Levy

[11] B1 4,202,396
[45] Certificate Issued Jun. 4, 1996

[54] MOTOR VEHICLES AND SUNSHIELDS

[75] Inventor: Abraham Levy, Tel Aviv, Israel

[73] Assignee: Levy Amnon, Agoura, Calif.

Reexamination Request:
No. 90/003,940, Sep. 7, 1995

Reexamination Certificate for:
Patent No.: 4,202,396
Issued: May 13, 1980
Appl. No.: 912,653
Filed: Jun. 5, 1978

Related U.S. Application Data

[63] Continuation-in-part of Ser. No. 409,920, Oct. 26, 1973.

[30] Foreign Application Priority Data

| Jun. 20, 1973 | [IL] | Israel | 5668 |
| Jun. 20, 1973 | [IL] | Israel | 5669 |
| Jun. 28, 1973 | [IL] | Israel | 5672 |
| Jun. 28, 1973 | [IL] | Israel | 5673 |
| Jul. 9, 1973 | [IL] | Israel | 5679 |
| Jul. 20, 1973 | [IL] | Israel | 42796 |

[51] Int. Cl.$^6$ ................................. E06B 3/32
[52] U.S. Cl. ............ 160/107; 160/229.1; 160/84.04; 160/DIG. 2; 296/97.7; 296/97.8
[58] Field of Search .............. 160/107, 84.04, 160/229.1, 370.22, 370.23, DIG. 2, DIG. 3; 296/97.7, 97.8

[56] References Cited

U.S. PATENT DOCUMENTS

| 1,569,868 | 1/1926 | Loeb . | |
| 1,663,044 | 3/1928 | Furlong . | |
| 2,305,677 | 12/1942 | Cotton | 296/97 |
| 2,991,119 | 7/1961 | Young | 296/97 |
| 3,003,812 | 10/1961 | Haugland | 296/97 |
| 4,005,899 | 2/1977 | Rigney | 296/97 |

FOREIGN PATENT DOCUMENTS

| 12235/33 | 2/1934 | Australia . |
| 1485651 | 6/1967 | France . |
| 225847 | 1/1977 | Spain . |
| 859268 | 1/1961 | United Kingdom . |

OTHER PUBLICATIONS

Spanish Utility Model Application No. 225,847 entitled: Sunshade For Motor Vehicles by Abraham Levy published on Mar. 16, 1977.

*Primary Examiner*—David M. Purol

[57] ABSTRACT

A foldable sunshield for motor vehicles comprises a plurality of planar rectangular elements which are joined along their longitudinal edges to form, in the stretched position, a substantially continuous partition and, in the folded position, a prismatic package, at least two planar rectangular elements being provided, in the preferred embodiment, with flap extensions. The sunshield may be used in combination with a window of a motor vehicle and devices, equipment or expedients for releasably retaining the sunshield at the window, such as a rear view window, sun visors, hooks, window edges and gaskets, the steering wheel, and the like.

B1 4,202,396

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-26 is confirmed.

* * * * *